Dec. 5, 1933.　　　L. S. SHELDRICK　　　1,937,988
BRAKE CROSS SHAFT MOUNTING
Filed Sept. 8, 1930
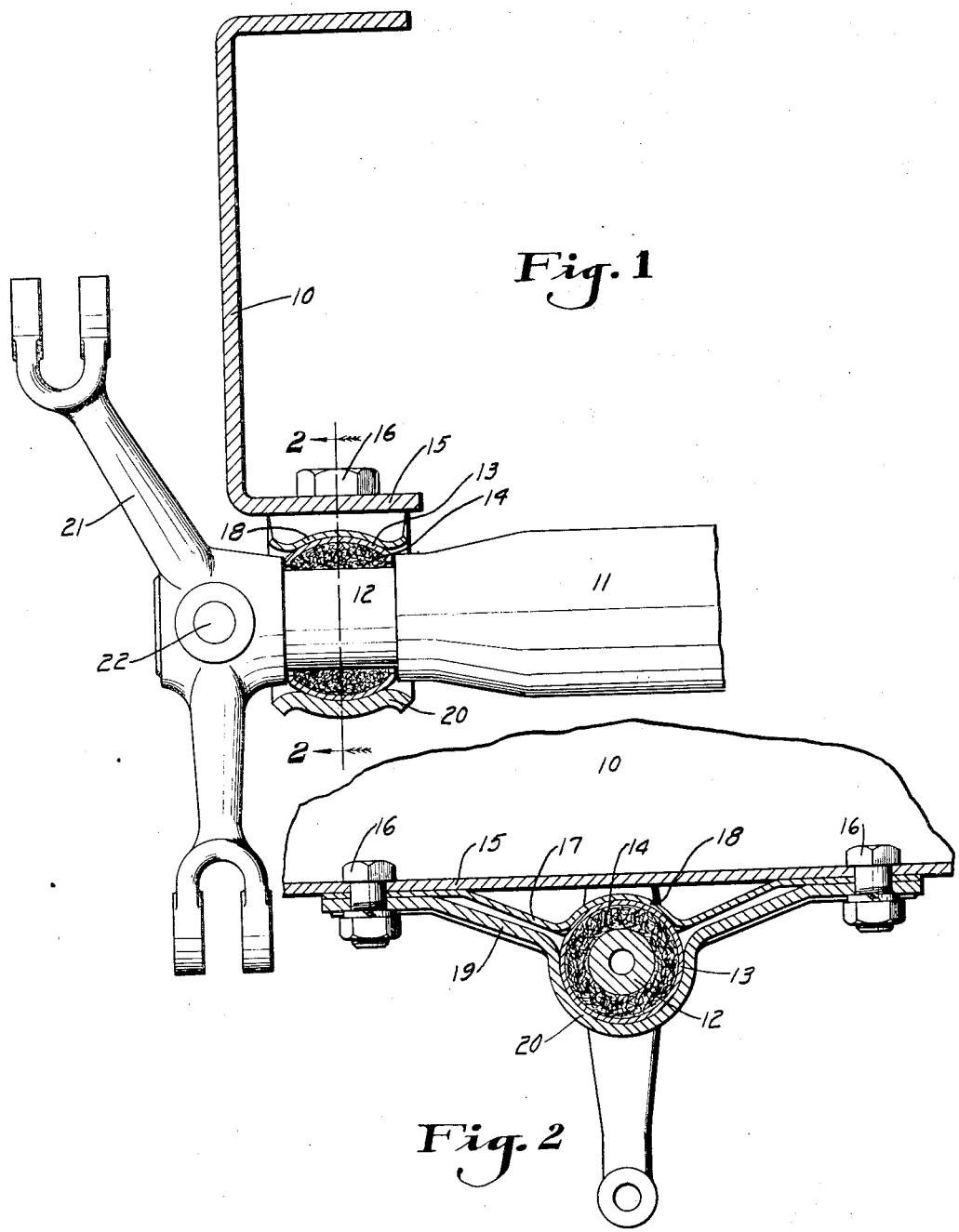
INVENTOR.
L. S. Sheldrick
BY
ATTORNEY.
Witness.

Patented Dec. 5, 1933

1,937,988

UNITED STATES PATENT OFFICE 1,937,988

BRAKE CROSS SHAFT MOUNTING

Laurence S. Sheldrick, Dearborn, Mich., assignor to Ford Motor Company, Dearborn, Mich., a corporation of Delaware Application September 8, 1930. Serial No. 480,441

6 Claims. (Cl. 308—72)

The object of my invention is to provide a brake cross shaft mounting of simple, durable, and inexpensive construction.

Still a further object of my invention is to provide a brake cross shaft mounting especially adapted for supporting an automobile brake cross shaft rotatably beneath the chassis side frame member which mounting will be easy to assemble to the chassis.

Still a further object of my invention is to provide a brake cross shaft mounting whereby the cross shaft may be freely secured in bearings which are fastened to the chassis frame, and wherein these bearings may be readily aligned with each other to thus freely rotatably mount the shaft irrespective of variations of alignment in the chassis frame members.

It is essential for the successful operation of automobile brakes that the brake cross shaft be arranged to oscillate freely in its bearings as binding of the shaft would cause the brakes to remain applied after the foot pedal was released. Of course, an extremely heavy returning spring might be provided for more positively returning the brake linkage even though binding of the shaft had occurred, however, such a heavy return spring would have to be energized by the application of the brake applying device or foot pedal so that such a spring is a decided disadvantage. It is very desirable to utilize all of the foot pedal pressure in applying the brakes and not in counteracting a returning spring so that the brakes may be easily applied to thereby provide a brake which may be conveniently operated by women drivers. On the other hand, the cross shaft bearings should be fitted so that rattle is prevented between the bearings and the shaft and so that water and grit will be excluded from the bearings to thereby prolong the life of the shaft.

In connection with the ordinary chassis frame it is extremely difficult to secure a pair of bearings thereto so that the cross shaft will be freely rotatably mounted. Part of this difficulty arises because the bearing retaining bolt holes are punched in the frame member before assembly so that they may or may not be exactly aligned in the assembled frame. Further, the bottom edges of the frame members must be parallel if the ordinary bearings are to be aligned, which frame members are difficult to draw so that they maintain this degree of accuracy required.

I am able to overcome these difficulties by mounting my bearings in spherical retainers which are fastened to the chassis frame members. No special care need be taken in fastening the bearing retaining members to the chassis frame inasmuch as a pair of perfectly aligned bearings will be readily secured regardless of the misalignment of the bearing retainers. Thus, a very light break return spring may be provided which will be adequate to return the linkage to its inoperative position. Due to the inability of the cross shaft to bind, this light return spring will function properly at all times and allow practically all of the foot pedal pressure to be used for applying the brakes.

Still a further object of my invention is to provide readily detachable means for conveniently assembling the cross shaft bearings to the under side of each side frame member so that the brake cross shaft assembly may be conveniently and quickly assembled in the car.

Still a further object of my invention is to provide a simple means whereby comparatively fragile graphite bearings may be used to rigidly support, against longitudinal movement, a brake cross shaft upon a vehicle frame which is subject to weaving. If such graphite bearings were to be rigidly secured to the frame side members and were fitted close enough to the shaft to prevent rattle then the weaving of the frame would crack the graphite causing failure of the bearing. With the construction about to be described, the bearings are permitted to oscillate, while at the same time they are rigidly held against longitudinal movement.

With these and other objects in view, my invention consists in the arrangement, construction and combination of the various parts of my improved device as described in the specification, claimed in my claims, and illustrated in the accompanying drawing, in which:

Figure 1 shows a vertical central sectional view through one end of my improved brake cross shaft mounting, and Figure 2 shows a sectional view taken on the line 2—2 of Figure 1.

Referring to the accompanying drawing, I have used the reference numeral 10 to indicate generally a frame side member of an automobile which frame member is ordinarily of channel section. My improved cross shaft consists of a tubular member 11 having each end thereof drawn down to a smaller diameter as at 12. The tubular portion of the shaft extends between the two side members 10 while the reduced portions 12 are disposed beneath the lower edges of the side members and extend slightly beyond the outer faces thereof.

I have provided a graphited oilless type bearing for each reduced portion 12 each of which consists of a spherical shell 13 having a diameter considerably larger than the shaft upon which it is mounted. The space between the shell and the reduced portion 12 forms an annular chamber of segmental section which chamber is filled with a graphited asbestos lining 14 to thereby provide oilless bearings for the shaft. It will be understood that the spherical shells 13 are first drawn or rolled from sheet metal and then the graphited linings pressed into the inside of the shells to form the finished bearings which may be slipped on over the reduced portions 12. The outer ends of the reduced portions 12 are provided with operating arms 21 secured thereto by rivets 22 so that rotation of the shaft will equally apply the front and rear wheel brakes. The purpose of providing the spherical shell is to form a simple means of compensating for the inaccuracies in the mounting of the bearings so that the shaft will have no tendency to bind.

The lower edge 15 of each side member 10 is provided with two spaced punch holes adapted to each receive a bolt 16 which extends therethrough to secure the bearings to the frame. I have provided spring steel strips 17 extending between the bolts 16 of each channel member, the intermediate portions of which have spherical recesses 18 pressed therein into which the upper sides of the shells 13 are mounted. Lower straps 19 are also secured to the frame by means of the bolts 16, these straps extending beneath the strips 17. The straps 19 are also provided with spherical recesses 20 which enclose the lower portions of the shells 13. The shells 13 are held between the recesses 18 and 20 there being sufficient spring in the strips 17 so that when the bolts 16 are tightened the shells will be rigidly secured beneath the frame side members against longitudinal movement. However, the spring steel strip 17 permits the bearing shell 13 to oscillate and thus maintain axial alignment with each other even though the brackets become axially misaligned from each other, due to the weaving of the frame member 10. It will be readily seen that even though the edges 15 of the frame members are not exactly parallel still the cross shaft will not bind because the bearings thereon may compensate for this misalignment.

To assemble my improved device the spherical bearings are first assembled over the outer ends of the reduced portions 12 and then the arms 21 are secured to the ends of the reduced portions thereby securing the bearings in place. This unit is then assembled to the frame members by securing the strips 17 and straps 19 around the bearings. The bolts 16 are then screwed home which fixedly secures the bearings in alignment with each other so that the cross shaft is freely rotatably mounted.

Among the many advantages arising from the use of my improved device, it may be well to mention that I have provided oilless type bearings for the ends of my cross shaft, which bearings will be automatically aligned during assembly to the chassis so that the shaft is assured of being freely mounted. I am thus able to use a light returning spring for the brake linkage to thereby provide easier operation of the brakes with the assurance that the brakes will always be returned to their inoperative positions.

Still further, the ease by which my cross shaft may be assembled to the automobile makes it a desirable structure from a commercial standpoint.

Some changes may be made in the arrangement, construction, and combination of the various parts of my improved device without departing from the spirit of my invention, and it is my intention to cover by my claims, such changes as may reasonably be included within the scope thereof.

I claim as my invention:

1. A motor vehicle comprising a frame member having two longitudinally spaced bolts extending downwardly therefrom, a resilient strip secured by said bolts to the underside of the frame member, the intermediate portion of said strip having a spherical recess formed therein, which recess is spaced below the lower edge of the frame member, a relatively heavy strap having a complementary spherical recess formed therein secured by said bolts beneath said strip, said spherical recesses having a spherical bearing mounted therebetween, and a shaft rotatably mounted in said bearing, there being sufficient resiliency in said strip so that when the bolts are tightened the bearing will be resiliently secured in position to compensate for possible misalignment and movement between said shaft and frame member, and said strap having sufficient rigidity to resist transverse loads upon the bearing.

2. A motor vehicle comprising a frame member having two longitudinally spaced bolts extending downwardly therefrom, a flat spring steel strip secured by said bolts to the underside of the frame member, the intermediate portion of said strip having a spherical recess formed therein, which recess is spaced below the lower edge of the frame member, a relatively heavy strap having a complementary spherical recess formed therein secured by said bolts beneath the spring steel strip, said spherical recesses having a spherical bearing mounted therebetween, and a shaft rotatably mounted in said bearing, there being sufficient resiliency in said strip so that when the bolts are tightened the bearing will be resiliently secured in position to compensate for possible misalignment and movement between said shaft and frame member, and said strap having sufficient rigidity to resist transverse loads upon the bearing.

3. A motor vehicle comprising a frame member having two longitudinally spaced bolts extending downwardly therefrom, a flat resilient strip secured by said bolts to the underside of the frame member, the intermediate portion of said strip being spaced below the lower edge of the frame member, a relatively heavy strap having a spherical recess formed therein secured by said bolts beneath said resilient strip, a spherical bearing mounted in said recess between said strap and resilient strip, and a shaft rotatably mounted in said bearing, there being sufficient resiliency in said strip so that when the bolts are tightened the bearing will be resiliently secured in position to compensate for possible misalignment and movement between said shaft and frame member, and said strap having sufficient rigidity to resist transverse loads upon the bearing.

4. A device, as claimed in claim 3, wherein the spherical bearing is composed of a fragile material, the bearing mounting being sufficiently free so that relative movement between the shaft and frame will not fracture the material.

5. A motor vehicle comprising a pair of channel-shaped frame side members each having two longitudinally spaced bolts extending downwardly therefrom, a resilient strip secured by said bolts to the underside of each channel member, the intermediate portion of each strip having a spherical recess formed therein, which recesses are spaced beneath the lower edges of the adjacent side member, a pair of relatively heavy straps each having a complementary spherical recess formed therein and each secured in position beneath one of the strips by said bolts, a spherical bearing mounted between each pair of said recesses, and a brake cross shaft rotatably mounted in said bearings, there being sufficient resiliency in said strips so that when the bolts are tightened the bearings will be resiliently secured in position to prevent binding and to compensate for weaving of the frame side members, and said straps having sufficient rigidity to resist the braking loads imposed on said shaft.

6. A motor vehicle comprising a pair of channel-shaped frame side members each having two longitudinally spaced bolts extending downwardly therefrom, a spring steel strip secured by said bolts to the underside of each channel member, the intermediate portion of each strip having a spherical recess formed therein, which recesses are spaced beneath the lower edges of the adjacent channel members, a pair of relatively heavy straps each having a complementary spherical recess formed therein and each secured in position by said bolts beneath one of said resilient strips, a fragile spherical bearing mounted between each pair of said recesses, and a brake cross shaft extending between and rotatably mounted in said bearings, there being sufficient resiliency in said strips so that when said bolts are tightened the bearings will be resiliently secured in position to prevent binding and to compensate for possible misalignment between the shaft and bearings, and said straps having sufficient rigidity to resist transverse loads upon the bearings.

LAURENCE S. SHELDRICK.